United States Patent [19]

Boehmke

[11] 4,036,826
[45] July 19, 1977

[54] CATIONIC AZO DYESTUFFS WITH A HYDROXYALKYLATED AMMONIUM GROUP

[75] Inventor: Günther Boehmke, Opladen, Germany

[73] Assignee: Bayer Aktiengesellschaft, Leverkusen, Germany

[21] Appl. No.: 445,833

[22] Filed: Feb. 26, 1974

[30] Foreign Application Priority Data

Feb. 26, 1973 Germany .............................. 2309528

[51] Int. Cl.$^2$ ..................... C09B 29/08; C09B 29/26; C09B 29/36; C09B 43/00
[52] U.S. Cl. .................................. 260/205; 260/152; 260/154; 260/156; 260/158; 260/206; 260/207; 260/207.1
[58] Field of Search ............... 260/149, 205, 206, 207, 260/207.1

[56] References Cited

U.S. PATENT DOCUMENTS

| 2,099,525 | 11/1937 | Krzikalla et al. ..................... 260/205 |
| 2,955,108 | 10/1960 | Omietanski .......................... 260/205 |
| 2,972,508 | 2/1961 | Kruckenberg et al. ......... 260/205 X |
| 3,079,377 | 2/1963 | Sartori ................................. 260/205 |
| 3,153,034 | 10/1964 | Liechti ................................. 260/205 |
| 3,354,182 | 11/1967 | Kuhne et al. .................... 260/206 X |
| 3,402,167 | 9/1968 | Entschel .......................... 260/205 X |
| 3,417,076 | 12/1968 | Sartori ................................. 260/205 |
| 3,759,893 | 9/1973 | James ................................ 260/149 |

FOREIGN PATENT DOCUMENTS

| 1,403,396 | 5/1965 | France ................................ 260/205 |
| 1,502,363 | 10/1967 | France .............................. 260/207.1 |
| 1,154,006 | 6/1969 | United Kingdom ................. 260/205 |
| 1,133,683 | 11/1968 | United Kingdom ................. 260/207 |
| 1,197,335 | 7/1970 | United Kingdom ............. 260/207.1 |

*Primary Examiner*—Charles F. Warren
*Attorney, Agent, or Firm*—Plumley and Tyner

[57] ABSTRACT

Cationic azo dyestuffs of the formula

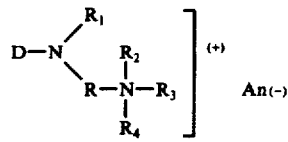

wherein
D denotes the radical of an azo dyestuff which is free of sulphonic acid groups,
R denotes an alkylene radical,
$R_1$ denotes hydrogen or alkyl,
$R_2$ denotes alkyl, alkenyl or aralkyl,
$R_3$ denotes alkyl and
$R_1$ and $R_2$, or $R_2$ and $R_3$, can together form the radical of a heterocyclic ring,
$R_4$ denotes hydroxyalkyl with 3 or more C atoms or arylhydroxyethyl and
An $(-)$ denotes an anion, are used for dyeing and printing of polymers and copolymers of acrylonitrile, acid modified polyesters or polyamides, leather, tanned cotton, polyurethanes and lignin containing fibers and for coloring writing liquids.

6 Claims, No Drawings

CATIONIC AZO DYESTUFFS WITH A HYDROXYALKYLATED AMMONIUM GROUP

The invention relates to cationic azo dyestuffs of the formula

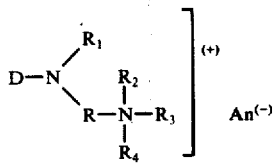

I wherein
D denotes the radical of an azo dyestuff which is free of sulphonic acid groups,
R denotes an alkylene radical,
$R_1$ denotes hydrogen or alkyl,
$R_2$ denotes alkyl, alkenyl or aralkyl,
$R_3$ denotes alkyl and
$R_1$ and $R_2$, or $R_2$ and $R_3$, can together form the radical of a heterocyclic ring,
$R_4$ denotes hydroxyalkyl with 3 or more C atoms or arylhydroxyethyl and
$An^{(-)}$ denotes an anion
and wherein the cyclic and acyclic substituents can contain further non-ionic substituents.

The invention further relates to processes for the preparation of the dyestuffs (I) and to the use of the dyestuffs for dyeing natural and synethetic materials.

Preferred azo dyestuffs are those of the formula

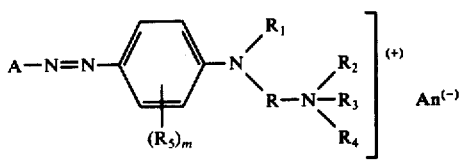

II wherein
A denotes the radical of an aromatic-carbocyclic or aromatic-heterocyclic diazo component,
$R_5$ denotes halogen, alkyl, alkoxy, aryloxy, acyl or acylamino,
m denotes 0, 1, 2, 3 or 4
and wherein
the symbols R, $R_1$, $R_2$, $R_3$, $R_4$ and $An^{(-)}$ have the meaning indicated in the formula I.

Amongst these dyestuffs, those whereof the diazo component A represents a radical of the benzene, thiazole, benzthiazole, benzisothiazole or thiadiazole series should be singled out particularly.

Particularly preferred dyestuffs are those of the formulae

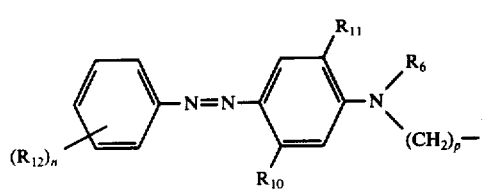

III

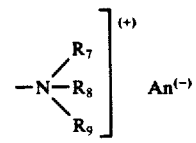

wherein
$R_6$ denotes methyl, ethyl, propyl or butyl,
$R_7$ denotes methyl, ethyl, propyl or butyl,
$R_8$ denotes methyl, ethyl, propyl or butyl,
$R_9$ denotes 2-hydroxypropyl, 2-hydroxybutyl, 2-hydroxyethylphenyl, 2-hydroxy-3-methoxy-propyl, 2-hydroxy-3-chloro-propyl, 2-hydroxy-3-ethoxy-propyl, 2-hydroxy-3-propoxy-propyl, 2-hydroxy-3-allyloxypropyl, 2-hydroxy-3-butoxy-propyl, 2-hydroxy-3-phenoxy-propyl and 2-hydroxy-3-benzoxy-propyl,
$R_{10}$ denotes hydrogen, methyl, ethyl, propyl, butyl, halogen, methoxy, ethoxy, propoxy, acetyl, propionyl or methylsulphonylamino,
$R_{11}$ denotes hydrogen, methyl, ethyl, propyl, butyl, halogen, methoxy, ethoxy or propoxy,
$R_{12}$ denotes methyl, ethyl, propyl, butyl, halogen, nitrile, nitro, methoxy, ethoxy, propoxy, methoxycarbonyl or ethoxycarbonyl, acetoxy, acetyl, sulphonamido or carbonamido,
n denotes 1 to 5,
p denotes 2 or 3 and
$An^{(-)}$ denotes an anion and

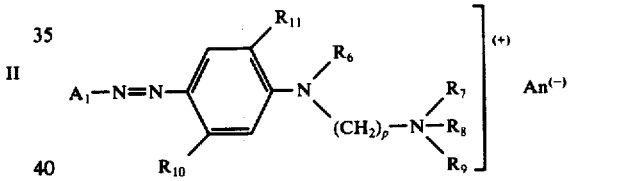

IV wherein
$A_1$ represents radicals of the formulae

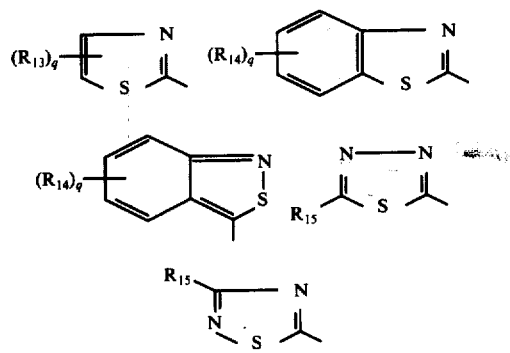

in which
$R_{13}$ denotes $C_1$–$C_5$-alkyl, phenyl, nitrile, nitro or carbomethoxy,
$R_{14}$ denotes $C_1$–$C_5$-alkyl, $C_1$–$C_4$-alkoxy, phenoxy, nitro, carbomethoxy or halogen,
$R_{15}$ denotes hydrogen; $C_1$–$C_5$-alkyl; $C_1$–$C_4$-alkoxy; phenoxy; cyclohexyl; phenyl; phenyl substituted by methyl, ethyl, methoxy, ethoxy, nitro, chlorine or acetylamino; benzyl, methylmercapto, ethylmercapto or phenylmercapto, benzylmercapto, dimethylamino or diethylamino or methylsulphonyl, ethylsulphonyl or phenylsulphonyl and q denotes 0, 1 or 2 and wherein $R_6-R_{11}$ and $An^{(-)}$ have the meaning indicated in the formula III and p represents 2 or 3.

Amongst these dyestuffs, those in which n denotes 1-3 and q denotes 0 or 1 are preferred.

Suitable alkyl radicals are those with 1-14 C atoms and their substitution products, such as β-chloroethyl, β-cyanoethyl or β-methoxycarbonyl-ethyl.

Particularly suitable alkyl radicals $R_4$ are 2-hydroxypropyl and 2-hydroxybutyl radicals which are unsubstituted or substituted by $C_1-C_4$-alkoxy, $C_2-C_4$-alkenyloxy, phenoxy or benzyloxy.

Particularly suitable alkenyl radicals are, for example, those with 2 - 7 C atoms and their substitution products, such as γ-chloro-allyl.

Suitable alkylene radicals are, for example, straight-chain and branched radicals with 2-5 C atoms which can be substituted; for example, a methylene group can be replaced by a carbonyl group.

Suitable aryl radicals are, in particular, optionally substituted phenyl and naphthyl radicals.

Substituents are for example $C_1-C_5$-alkyl or $C_1-C_4$-alkoxy.

Aralkyl radicals are particularly the benzyl and the β-phenylethyl radical and their derivatives, which are substituted in the phenylring by $C_1-C_5$-alkyl or $C_1-C_4$-alkoxy.

Suitable acyl radicals are, in particular, alkylcarbonyl and alkylsulphonyl radicals with 1-4 C atoms in the alkyl radical.

The substituents $R_1$ and $R_2$ together in particular form the radical of a 5-membered or 6-membered ring, for example of a piperazine ring.

The substituents $R_2$ and $R_3$ together in particular form the radical of a 5-membered or 6-membered ring, for example of a pyrolidine, piperidine or morpholine ring.

Possible anions $An^{(-)}$ are the organic and inorganic anions customary for cationic dyestuffs.

Examples of inorganic anions are chloride, bromide, iodide, hydoxyl, bisulphate, sulphate, aminosulphate, nitrate, dihydrogen-phosphate, hydrogen-phosphate, phosphate, carbonate, methosulphate, ethosulphate, cyanate or isocyanate.

Examples of organic anions are formate, acetate, chloroacetate, hydroxyacetate, cyanoacetate, phenoxyacetate, propionate, 3-chloropropionate, 2-hydroxypropionate, 3-hydroxypropionate, 3-(β-hydroxyethoxy)-propionate, laurate, oleate, glycollate, thioglycollate, citrate, glycerate, itaconate, acrylate, methacrylate, crotonate, oxalate, malonate, succinate, glutarate, adipate, tartrate, fumarate, maleate, ethanesulphonate, aminoethanesulphonate, methylaminoethanesulphonate, acylaminoethylsulphonate, hydroxyethanesulphonate, benzenesulphonate, $C_1-C_{12}$-alkylenebenzenesulphonate, benzoate, 2-hydroxybenzoate or 4-hydroxybenzoate.

Colourless anions are preferred. For dyeing from an aqueous medium, anions which do not excessively impair the solubility of the dyestuff in water are preferred. For dyeing from organic solvents, anions which assist the solubility of the dyestuff in organic solvents, for example laurate, oleate, dodecylbenzenesulphonate or acetylaminoethyl-sulphonate are preferred.

The anion is in general decided by the process of preparation. In general, the dyestuffs are in the form of halides or acetates. The anions can be replaced by other anions in a known manner.

The dyestuffs of the formula (I) are obtained in a manner which is in itself known, for example by reaction of dyestuffs of the formula

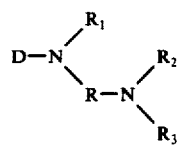

V wherein

D, R, $R_1$, $R_2$ and $R_3$ have the meaning indicated in the formula I with compounds of the formula

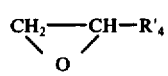

VI wherein $R_4'$ represents an alkyl radical whereof the number of carbon atoms is less by 2 than that of $R_4$, or respresents an aryl radical.

The reaction takes place at temperatures of 30°-130° C, especially 50°-90° C, in water and/or organic solvents, in the presence of compounds which yield anions $An^{(-)}$, in an acid medium. The dyestuff base (V) is preferably dissolved or suspended with the acid desired as the anion in the finished dyestuff.

Examples of possible organic solvents are alcohols, ketones, esters or halogenohydrocarbons.

The acid medium is preferably obtained by using inorganic and organic acids or acid halides.

To produce a dyestuff powder, the solvent used is generally water, to which small proportions of a non-ionic wetting agent can also be added in the case of sparingly soluble tertiary dyestuff salts (see N. Schönfeldt, Additionsprodukte des Aethylenoxids (Addition Products of Ethylene Oxide)). The readily soluble quaternary dyestuffs can be salted out by means of the alkali metal salt corresponding to the acid employed.

The dyestuffs can also be used for dyeing as a liquid composition, without isolation from the reaction solution. Because of their high solubility in water and organic solvents, the dyestuffs are particularly suitable for the preparation of ready-to-use liquid formulations.

The dyestuffs of the formula (I) can also be prepared by coupling as the last reaction stage. For example, the dyestuffs (II) can be prepared by diazotising amines of the formula $A-NH_2$     VII wherein A has the meaning indicated in the formula (II) and coupling the product with compounds of the formula

VIII

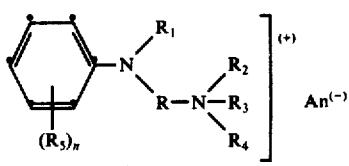

wherein

R to R₅, n and An⁽⁻⁾ have the meaning indicated in the formula (I).

The coupling component (VIII) is prepared by reaction of the amines of the formula

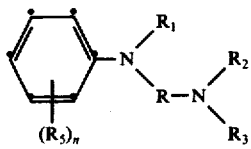

IX wherein

R to R₅ and n have the meaning indicated in the formula (I)

with the compounds (VI), under the conditions indicated for the reaction of (V) with (VI).

Examples of suitable alkylene oxides VI are propylene oxide, 1,2 -butylene oxide, 1,2-pentylene oxide, 1,2-hexylene oxide, methoxypropylene oxide, ethoxypropylene oxide, propoxypropylene oxide, allyloxypropylene oxide, butoxypropylene oxide, phenoxypropylene oxide, benzyloxypropylene oxide, chloropropylene oxide or styrene oxide.

Examples of suitable amines (VII) are: 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methoxycarbonylbenzene, 1-amino-2,4-dichlorobenzene, 1-amino-2,4-dibromobenzene, 1-amino-2-methyl-4-chlorobenzene, 1-amino-2-cyano-4-chlorobenzene, 1-amino-2-cyano-4-nitrobenzene, 1-amino-2-chloro-4-cyanobenzene, 1-amino-2-chloro-4-nitrobenzene, 1-amino-2,4-dinitrobenzene, 1-amino-2,4-dicyanobenzene, 1-amino-2,4-dicyano-3,5-dimethylbenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene, 1-amino-3-chloro-4-cyanobenzene, 1-amino-2-cyano-5-chlorobenzene, 1-amino-2-cyano-4,5,6-trichlorobenzene, 1-amino-2-methoxy-4-nitrobenzene, 1-amino-2-cyano-4-nitro-6-chlorobenzene, 1-amino-2,6-dicyano-4-nitrobenzene, 1-amino-2,6-dicyano-4-chlorobenzene, 1-amino-2,6-dicyano-4-methylbenzene, 1-amino-2-methyl-4-nitrobenzene, 1-amino-2-bromo-4-nitrobenzene, 1-amino-2-cyanobenzene, 2-amino-1,3,4-thiadiazole, 2-amino-5-methyl-1,3,4-thiadiazole, 2-amino-5-ethyl-1,3,4-thiadiazole, 2-amino-5-n-propyl-1,3,4-thiadiazole, 2-amino-5-isobutyl-1,3,4-thiadiazole, 2-amino-5-tert.-butyl-1,3,4-thiadiazole, 2-amino-5-sec.-butyl-1,3,4-thiadiazole, 2-amino-5-n-pentyl-1,3,4-thiadiazole, 2-amino-5-isopentyl-1,3,4-thiadiazole, 2-amino-5-β-methoxyethyl-1,3,4-thiadiazole, 2-amino-5-cyclohexyl-1,3,4-thiadiazole, 2-amino-5-phenyl-1,3,4-thiadiazole, 2-amino-5-(p-nitrophenyl)-1,3,4-thiadiazole, 2-amino-5-(p-chlorophenyl)-1,3,4-thiadiazole, 2-amino-5-(2,4-dichlorophenyl)-1,3,4-thiadiazole, 2-amino-5-(4-phenoxyphenyl)-1,3,4-thiadiazole, 2-amino-5-benzyl-1,3,4-thiadiazole, 2-amino-5-n-hexyl-1,3,4-thiadiazole, 5-amino-1,2,4-thiadiazole, 3-phenyl-5-amino-1,2,4-thiadiazole, 5-amino-3-(4-chlorophenyl)-1,2,4-thiadiazole, 5-amino-3-(2,4-dichlorophenyl)-1,2,4-thiadiazole, 5-amino-3-(4-nitrophenyl)-1,2,4-thiadiazole, 5-amino-3-benzyl-1,2,4-thiadiazole, 5-amino-3-butyl-1,2,4-thiadiazole, 2-aminobenzthiazole, 2-amino-6-methoxybenzthiazole, 2-amino-6-nitrobenzthiazole, 2-amino-5,6-dimethoxy-benzthiazole, 2-amino-6-benzoxybenzthiazole, 2-amino-6-chloro-benzthiazole, 2-aminothiazole, 2-amino-5-cyano-thiazole, 2-amino-5-nitro-thiazole, 2-amino-5-phenyl-thiazole, 2-amino-5-(p-tolyl)-thiazole, 2-amino-4-methyl-5-nitro-thiazole, 2-amino-4-methyl-5-phenylthiazole, 3-amino-2,1-benzisothiazole, 5-nitro-3-amino-2,1-benzisothiazole, 5-nitro-7-chloro-3-amino-2,1-benzisothiazole, 5-nitro-7-bromo-3-amino-2,1-benzisothiazole, 5-chloro-3-amino-2,1-benzisothiazole and 5,7-dichloro-3-amino-2,1-benzisothiazole.

Suitable compounds (IX) are: N-ethyl-N-(β-dimethylaminoethyl)-aniline, N-ethyl-N-(β-dimethylaminobutyl)-aniline, N-β-methoxyethyl-N-(β-dimethylaminoethyl)-aniline, N-β-chloroethyl-N-(β-dimethylaminoethyl)-aniline, N-propyl-N-(β-dimethylaminoethyl)-aniline, N-n-butyl-N-(γ-dimethylamino-n-propyl)-aniline, N-ethyl-N-(β-dimethylaminoethyl)-m-toluidine, N-methyl-N-(β-methyl-n-butylaminoethyl)-m-touidine, N-ethyl-N-(β-dimethylaminoethyl)-2,5-dimethoxy-aniline, N-ethyl-N-(β-din-propylaminoethyl)-aniline, N-β-methoxyethyl-N-(β-dimethylaminoethyl)-m-toluidine, N-ethyl-N-(β-aminoethyl)-aniline, N-ethyl-N-(β-methylaminoethyl)-aniline, N-n-butyl-N-(γ-dimethylaminopropyl)-aniline, N-methyl-N-(γ-di-β-chloroethylaminopropyl)-aniline, N-methyl-N-(β-methyl-n-butylaminoethyl)-m-toluidine, N-ethyl-N-(β-methyl-(β-methyl-(β-cyanoethyl)-aminoethyl)-aniline, N-ethyl-N-(β-cyanoethylaminoethyl)-aniline, N-methyl-N-(δ-dimethylaminobutyl)-m-toluidine, N-β-hydroxyethyl-N-(β-chloropropylaminoethyl)-aniline, N-methyl-N-(dimethylaminoethyl)-2,5-diethoxy-aniline, N-ethyl-N-(β-di-n-propylaminoethyl)-aniline, N-ethyl-N-β-methylcarbomethoxymethylaminoethylaniline, N-ethyl-N-(β-dimethylaminoethyl)-3-methyl-6-methoxy-aniline, N-3-methyl-butyl-N-dimethylaminoethyl-aniline, N-ethyl-N-(β-dimethylaminoethyl)-3-acetylamino-aniline or N-ethyl-N-(β-dimethylaminoethyl)-3-methylsulphonyl-aniline.

The dyestuffs according to the invention are particularly suitable for dyeing and printing fibres, fabrics and fleeces of polymers of acrylonitrile or 1,1-dicyanoethylene or copolymers of these components with other vinyl compounds, such as vinyl chloride, vinylidene chloride, vinyl acetate, vinylpyridine, vinylimidazole, acrylic acid esters and methacrylic acid esters, fibres, fabrics and fleeces of acidmodified polyesters, such as are described, for example, in U.S. Pat. Nos. 2,893,816, 3,018,272 and 3,166,531, and fibres, fabrics and fleeces of acid-modified polyamides, such as are described, for example, in U.S. Pat. Nos. 3,039,990 and 3,454,351.

As is customary with cationic dyestuffs, dyeing can be effected from a neutral or acid aqueous liquor at 40°-100° C or under pressure at above 100° C. It can be carried out with addition of the customary auxiliaries, for example in the presence of retarders such as dodecyldimethyl-benzylammonium chloride, or of non-ionic auxiliaries such as stearyl alcohol with 50 mols of ethylene oxide, or dyeing accelerators such as benzyloxypropionitrile.

The dyestuffs which are readily soluble in organic solvents can also be employed for dyeing from organic solvents, for example chlorinated hydrocarbons.

When used for printing the polymers indicated, customary auxiliaries, such as wetting agents and thickeners, are added to the printing inks.

The dyestuffs can be used with particular advantage for dyeing polyacrylonitrile spinning compositions before the dry spinning process or dyeing filaments obtained by the wet spinning process, prior to stretching.

The wet spinning process gives a filament which in spite of rinsing still contains traces of thiocyanate. The thiocyanate ions form sparingly soluble salts with the majority of basic dyestuffs. However, the dyestuffs according to the invention remain in solution in the presence of thiocyanate ions.

The good solubility of the new dyestuffs, which has already been mentioned, permits the preparation of highly concentrated solutions which can advantageously be employed, instead of powder preparations, for the dyeing and printing processes mentioned. For example it is possible to prepare storage-stable 10 to 60% strength solutions of the dyestuffs in water and/or organic solvents, such as formic acid, acetic acid, propionic acid, lactic acid, polyhydric alcohols, ethers or esters or halogenated hydrocarbons.

EXAMPLE 1

37.5 g of the azo base of the following structure

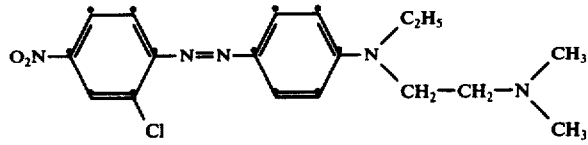

(prepared by coupling diazotised p-nitro-o-chloro-aniline with N-(β-dimethylaminoethyl)-N-ethylaniline) were suspended in 75 g of water and 5.0 g of concentrated sulphuric acid were added. During heating to 75° C, a part of the weakly acid salt dissolves. Gaseous propylene oxide is passed into the reaction mixture. After a short time, complete solution occurs. 12.5 g of polylene oxide are taken up over the course of about 3 hours. The mixture is stirred for a further hour. At this stage, dyestuff base can no longer be precipitated by means of ammonia from a sample diluted with water. 180 g of a 10% strength sodium chloride solution are slowly added dropwise to the batch which has been cooled to 20° C. The dyestuff hydrochloride precipitates and can be filtered off after stirring for 3 to 5 hours. After drying the dyestuff which has been filtered off, the yield obtained is 47 g of dyestuff of the structure

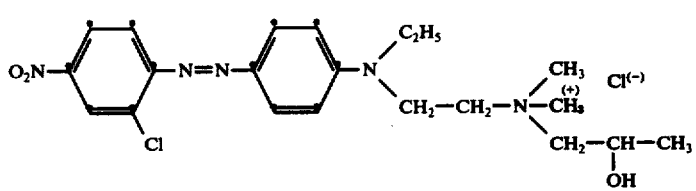

100 g of this dyestuff dissolve in 1 litre of water at 25° C. The hydrochloride of the corresponding N-trimethylammonium dyestuff has a solubility of approx. 1 g in 1 liter of water at 25° C. The solubility of the hydrochloride of the N-dimethyl-β-hydroxyethylammonium derivative is approx. 8 g in 1 liter of water at 25° C.

The dyestuff dyes polyacrylonitrile and acid-modified polyester and polyamide fibers in brownish-red shades. It has a K-value of approx. 3 (for definition of the K-value, see W. Beckmann, Zeitschrift für die gesamte Textilindustrie, 71 (1969), pages 603–608).

Dyestuffs of the formula:

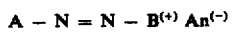

are obtained analogously.

| A | B(+) | An(−) | Colour shade on polyacrylonitrile |
|---|---|---|---|
| 4-NO$_2$, 2-Cl-phenyl | N(CH$_3$)(4-CH$_3$-C$_6$H$_4$)–CH$_2$–CH$_2$–N(CH$_3$)(CH$_2$–CH$_2$–OH)(CH$_2$–CH(OH)–CH$_3$) | Cl(−) | red |
| 4-NO$_2$, 2-Cl-phenyl | N(CH$_3$)(4-CH$_3$-C$_6$H$_4$)–CH$_2$–CH$_2$–N(CH$_3$)(CH$_2$–CH(OH)–CH$_2$–O–C$_6$H$_5$) | ½ CO$_3^{(−)}$ | red |
| 4-NO$_2$, 2-Cl-phenyl | N(C$_4$H$_9$)(4-CH$_3$-C$_6$H$_4$)–CH$_2$–CH$_2$–N(CH$_3$)(CH$_2$–CH(OH)–CH$_2$–O–C$_6$H$_5$) | CH$_3$–COO(−) | red |
| 4-NO$_2$, 2-Cl-phenyl | N(C$_2$H$_5$)(4-CH$_3$-C$_6$H$_4$)–CH$_2$–CH$_2$–N(CH$_3$)(CH$_2$–CH(OH)–CH$_2$–O–C$_4$H$_9$) | CH$_3$–COO(−) | yellow-brown |
| 4-NO$_2$, 2-Cl-phenyl | N(C$_2$H$_5$)(4-CH$_3$-C$_6$H$_4$)–CH$_2$–CH$_2$–N(CH$_3$)(CH$_2$–CH$_2$–CN)(CH$_2$–CH$_2$–O–CH$_3$) | CH$_2$–COO(−), CH$_2$–COO(−) | yellow-brown |
| 4-NO$_2$, 2-Cl-phenyl | N(C$_2$H$_5$)(4-CH$_3$-C$_6$H$_4$)–CH$_2$–CH$_2$–N(CH$_3$)(CH$_2$–CH$_2$–CN)(CH$_2$–CH$_2$–O–CH$_3$) | C$_{17}$H$_{33}$–CO–N(CH$_3$)–CH$_2$–CH$_2$–SO$_3^{(−)}$ | yellow-brown |

-continued
| A | B(+) | An(−) | Colour shade on polyacrylonitrile |
|---|---|---|---|
| 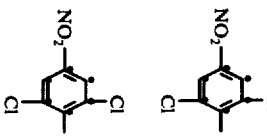 | 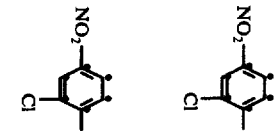 | CH₃—CH—COO (−)<br>       \|<br>       OH | red |
| 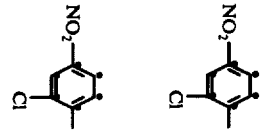 | 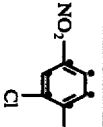 | Br (−) | red |
|  | 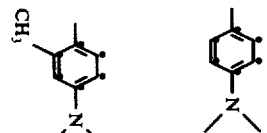 | I (−) | red |
|  | 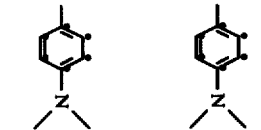 | H₂PO₄ (−) | red |
| 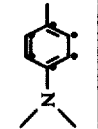 |  | CH₃—COO (−) | red |
| 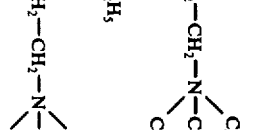 | 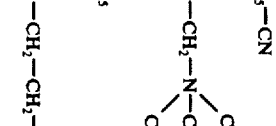 | CH₃—COO (−) | yellow-brown |
| 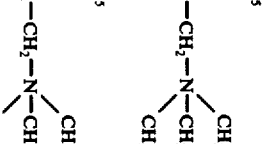 |  | HSO₄ (−) | brown |
|  | 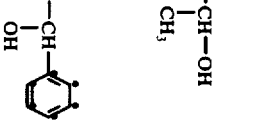 | | |

-continued

| A | B(+) | An(-) | Colour shade on polyacrylonitrile |
|---|---|---|---|
| 3-NO$_2$, 2-CN phenyl | 4-CH$_3$ phenyl-N(C$_4$H$_9$)(CH$_2$-CH(CH$_3$)-CH$_2$-OH) | CH$_3$-COO$^{(-)}$ | bluish-tinged red |
| 3-NO$_2$, 2-CN phenyl | 4-CH$_3$ phenyl-N(CH$_2$-CH$_2$-OCH$_3$)(CH$_2$-CH(CH$_3$)-OH) | HO-CH$_2$-CH$_2$-SO$_3{}^{(-)}$ | bluish-tinged red |
| 3-NO$_2$, 2-CN phenyl | 4-CH$_3$ phenyl-N(CH$_2$-CH$_2$-O-C$_4$H$_9$)(CH$_2$-CH(CH$_3$)-OH) | HCOO$^{(-)}$ | bluish-tinged red |
| 3-Cl, 4-Cl phenyl | 4-CH$_3$ phenyl-N(CH$_2$-CH$_2$-N(CH$_3$)(CH$_3$))(CH$_2$-CH(CH$_3$)-OH) | CH$_3$-SO$_4{}^{(-)}$ | yellow |
| 3-Cl, 4-Cl phenyl | 4-CH$_3$ phenyl-N(CH$_2$-CH$_2$-CH$_3$)(CH$_2$-CH(CH$_3$)-OH) | CH$_3$-COO$^{(-)}$ | yellow |
| 3-Cl, 4-Cl phenyl | 3-OCH$_3$, 4-OCH$_3$ phenyl-N(CH$_2$-CH$_2$-CH$_3$)(CH$_2$-CH$_2$-CH$_2$-OCH$_3$) | CH$_3$-COO$^{(-)}$ | yellow |
| 3-Cl, 4-Cl phenyl | 4-CH$_3$ phenyl-N(CH$_2$-CH$_2$-CH$_3$)(CH$_2$-CH$_2$-N(CH$_2$-CH$_2$)$_2$O)(CH$_2$-CH(CH$_3$)-OH) | | |

-continued
| A | B(+) | An(-) | Colour shade on polyacrylonitrile |
|---|---|---|---|
| 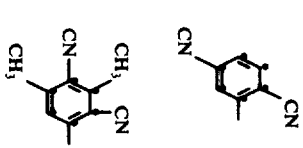 | 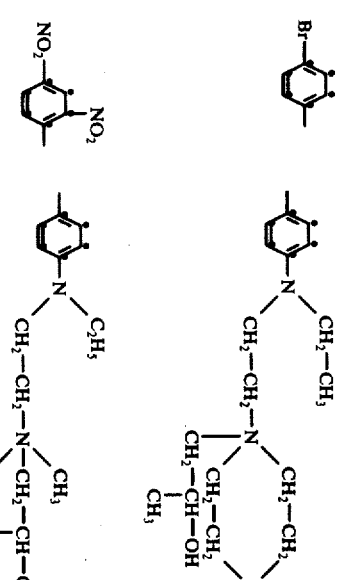 | $CH_3-COO^{(-)}$ | yellow |
| 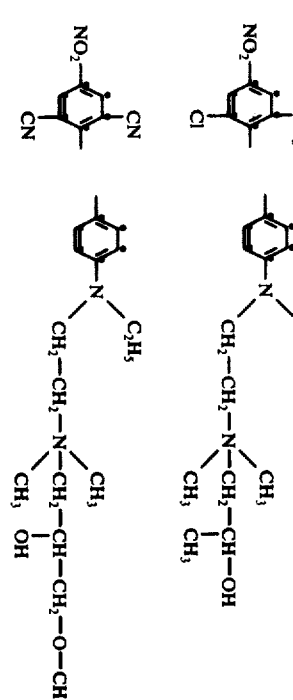 | 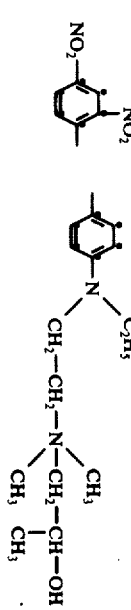 | $HCOO^{(-)}$ | violet |
| 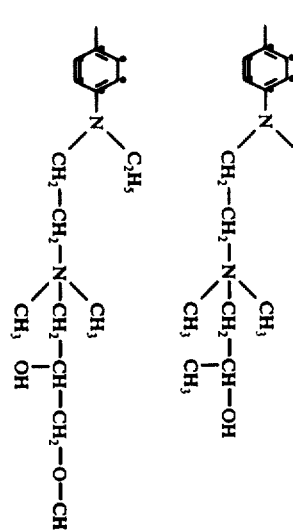 | 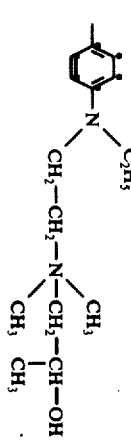 | $\frac{1}{2}SO_4^{2(-)}$ | violet |
| 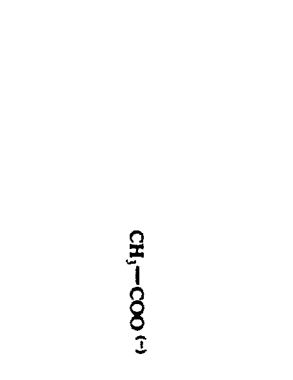 |  | $CH_3-COO^{(-)}$ | violet |
| 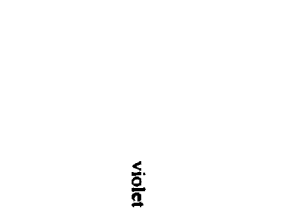 |  | $CH_3-COO^{(-)}$ | orange |
|  |  | $HCOO^{(-)}$ | red |
|  |  | | |

-continued

| A | B(+) | An(−) | Colour shade on polyacrylonitrile |
|---|---|---|---|
| 2,3-dimethyl-6-CN, with CH₃ and CN | N-(4-methylphenyl)-N-ethyl-N-(2-hydroxypropyl)-N',N'-dimethyl | CH₃—COO (−) | red |
| 3-NO₂-4-CH₃ | N-(4-methylphenyl)-N-ethyl-N-(2-hydroxybutyl)-N',N'-dimethyl with C₂H₅ | ⌬—COO (−) | red |
| 3-NO₂-4-CH₃ | N-(4-methylphenyl)-N-ethyl-N-(2-hydroxypropyl)-N'-methyl-N'-ethyl | ⌬—SO₃ (−) | strongly bluish-tinged red |
| 3-NO₂-4-CH₃-5-CN | N-(4-methylphenyl)-N-ethyl-(CH₂CH₂CH(OH)CH₂—O—CH₂—C₆H₅) | CH₃—COO (−) | orange |
| 3-CN-4-CH₃-5-Cl | N-(4-methylphenyl)-N-ethyl-N-(2-hydroxypropyl)-N',N'-dimethyl, CH₂Cl | CH₃—COO (−) | orange |
| 3-CN-4-CH₃-5-Cl | N-(4-methylphenyl)-N-(2-cyanoethyl)-N-(2-hydroxypropyl)-N',N'-dimethyl | COO(−)/COO(−) | orange |

EXAMPLE 2

37.5 g of the dyestuff base from Example 1 are dissolved in 30 g of acetic acid and 8 g of water. About 40 g of propylene oxide are added dropwise at a temperature of 70°–75° C. After 4 hours, the reaction is complete and the dyestuff has been completely converted into the acetate of the quaternished dyestuff.

A storage-stable dyestuff solution is obtained, which can be mixed with water and alcohol in any desired proportions.

EXAMPLE 3

37.5 g of dyestuff base from Example 1 are suspended in 50 g of tert.-butanol and 35 g of water. The mixture is warmed to 60°–70° C and 30 g of phenoxypropylene oxide are added. 12 g of acetic acid are added dropwise over the course of 4 hours, whilst stirring. The mixture is stirred for a further 2 hours.

The dyestuff

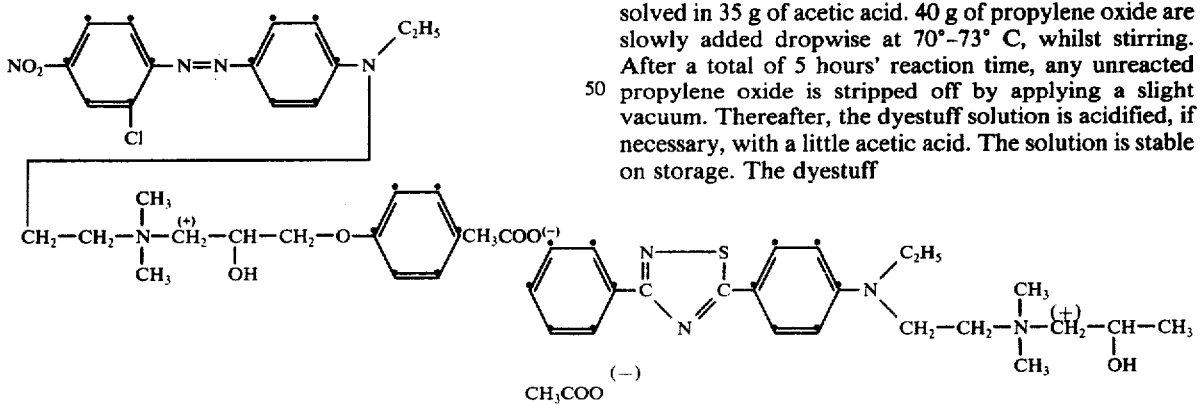

is stable in this solution. High dyestuff concentrations of, for example, 50 g/l, can also be prepared in aqueous solution at normal temperature. The dyestuff dyes polyacrylonitrile and acid-modified polyester and polyamide fibres in red shades of high fastness to light. The K-value is about 1.

EXAMPLE 4

25g of the dyestuff base

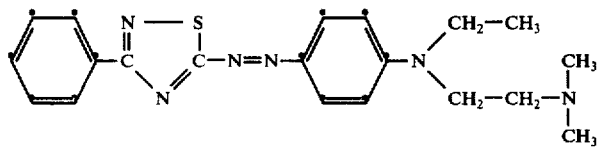

are dissolved in 10 g of tert.-butanol, 40 g of water and 4 g of acetic acid. 12 g of phenoxypropylene oxide are added dropwise over the course of 2 hours at 55°–60° C. After 1 hour, a further 1 g of acetic acid is added and the mixture is stirred for a further 2 hours. A stable solution of the dyestuff

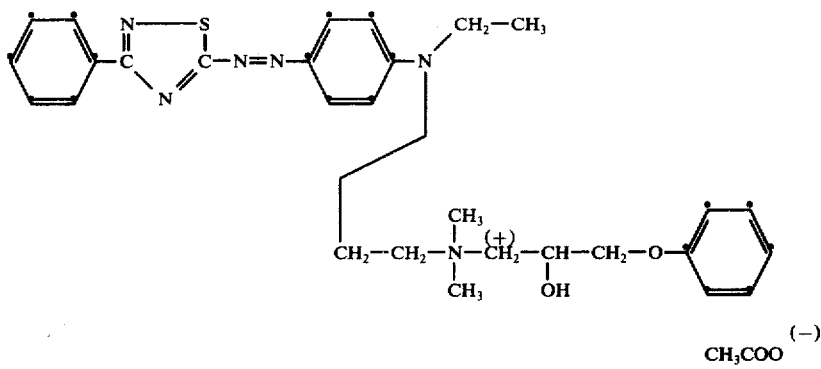

is obtained, which dyes polyacrylonitrile and acid-modified polyester and polyamide fibres in a very lightfast red colour shade. The K-value is 1.5.

EXAMPLE 5

25 g of the dyestuff base from Example 4 are dissolved in 35 g of acetic acid. 40 g of propylene oxide are slowly added dropwise at 70°–73° C, whilst stirring. After a total of 5 hours' reaction time, any unreacted propylene oxide is stripped off by applying a slight vacuum. Thereafter, the dyestuff solution is acidified, if necessary, with a little acetic acid. The solution is stable on storage. The dyestuff has a K-value of 3.5 – 4 and dyes fibers, which can be dyed with cationic dyestuffs, in a clear red.

Dyestuff solutions with dyestuffs of the formula $$A - N = N - B^{(+)} An^{(-)}$$

are obtained analogously.

| A | B(+) | An(−) | Colour shade of a dyeing |
|---|---|---|---|
| | | CH₃—COO(−) | red |
| | | C₉H₁₉—⟨⟩—SO₃(−) | red |
| | | HCOO(−) | red |
| | | Cl(−) | red |
| | | CH₃—COO(−) | red |
| | | CH₃—COO(−) | blue |
| | | CH₃COO(−) | blue |
| | | CH₃COO(−) | bluish-tinged red |
| | | CH₃COO(−) | bluish-tinged red |
| | | CH₃COO(−) | reddish-tinged blue |

EXAMPLE 6

25 g of the following dyestuff base

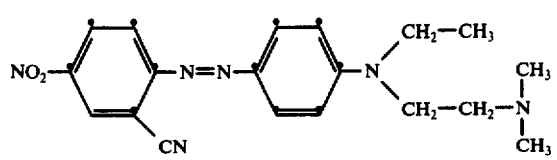

are dissolved in 25 g of acetic acid at 70° C. 30 g of propylene oxide are added dropwise over the course of 2 hours, whilst stirring well. The temperature is kept at 70°–75° C and after a further 3 hours the entire dyestuff has been quaternised. Thereafter, 8 g of an organic solvent, such as, for example, dimethylformamide or cyclohexanone, are also added. A stable dyestuff solution of a bluish-tinged red dyestuff of the following formula

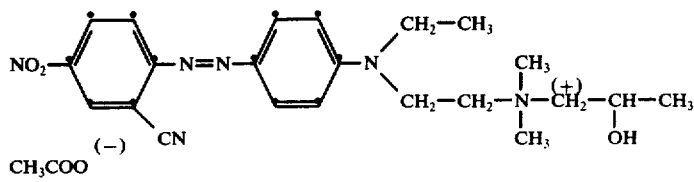

is obtained.

EXAMPLE 7

25 g of the dyestuff base of the following formula

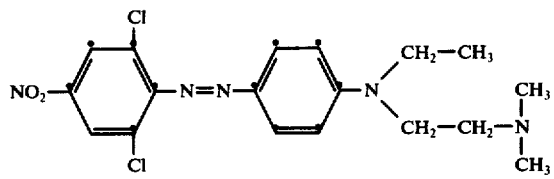

are dissolved in 25 g of acetic acid and 5 g of water at 70° C. 30 g of propylene oxide are added dropwise thereto over the course of about 2 hours. The temperature must not be raised above 80° C by the heat of reaction. In accordance with the heat of reaction, the heating is cut back or removed entirely. After 2 hours' reaction at 70°-75° C, the reaction is complete. The following dyestuff

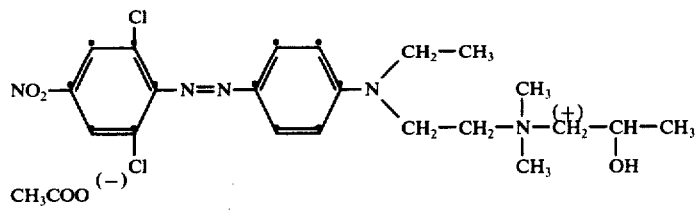

is obtained with a stable solution. This solution can be diluted with water in any desired ratio. It dyes polyacrylonitrile fibers and fabrics in a light-fast yellow-brown colour.

EXAMPLE 8

37 g of the dyestuff base of the following formula

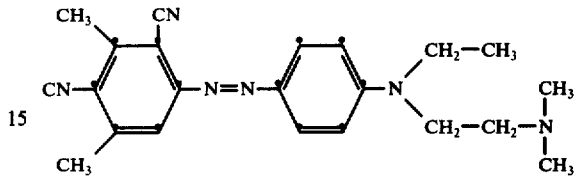

are dissolved in 8 g of water and 30 g of acetic acid. 40 g of propylene oxide are added dropwise over the course of 3 hours at 70°-80° C. After 2 hours' reaction time, the excess propylene oxide is distilled off by applying a slight vacuum. The pH value of a dilute sample must not be less than 7. If required, it is adjusted with acid.

A stable solution of the dyestuff

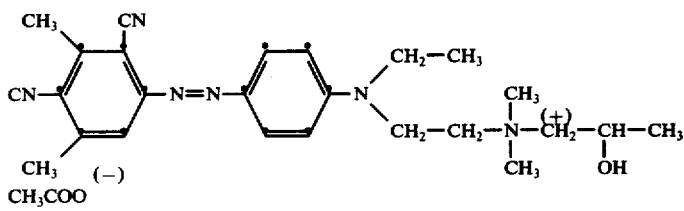

is outstandingly suitable for use in automatic metering installations in modern dyeing plants. The solution dyes polyacrylonitrile materials in a clear red.

EXAMPLE 9

25 g of the dyestuff base from Example 7 are dissolved in 20 g of acetic acid and 5 g of water. 35 g of 1,2-butene oxide are added dropwise over the course of 3 hours at 70°-75° C and the reaction is allowed to continue for a further 2 hours.

A stable water-miscible solution of the dyestuff

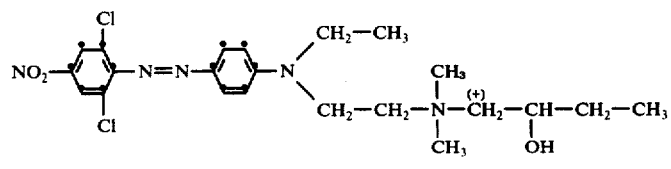

is obtained.

EXAMPLE 10

17 g of 2-chloro-4-nitro-aniline are finely divided in 50 g of water and 50 g of concentrated hydrochloric acid. A cooled solution of 7 g of sodium nitrite in 130 g of water is allowed to run into the suspension, cooled to 0° C, in such a way that the temperature can be kept at 0°-5° C by ice cooling. After stirring for approx. 2 hours, any excess nitrite which may be present is destroyed with amidosulphonic acid. A solution of 25 g of the following compound

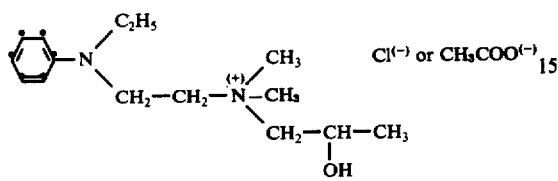

in 70 g of water is allowed to run slowly, under weakly acid conditions, into the diazonium salt solution which has been clarified by filtration if necessary, at 0°-5° C. About 60 g of a 20% strength sodium hydroxide solution are added dropwise, with good stirring, until a pH value of 6.5 is reached. After 2 hours, 30 g of sodium chloride are added. The dyestuff which initially has separated out as a viscous paste is allowed to crystallise whilst stirring. The crystalline dyestuff is then filtered off and freed as far as possible of the mother liquor in order to keep the contamination by salt as low as possible.

After drying, the dyestuff of Example 1 is obtained in a yield of 42 g.

The quaternary coupling component was obtained by the following procedure: 19.5 g of N-($\beta$-dimethylaminoethyl)-N-ethyl-aniline are dissolved in 60 g of water and 10 g of hydrochloric acid. 8 g of propylene oxide are added dropwise to this solution at 70°-75° C, whilst stirring, in such a way that only slight reflux results. After a total of 3 hours, a slight vacuum is applied to the reaction solution in order to remove the excess propylene oxide.

EXAMPLE 11

25 g of the dyestuff base from Example 1 are suspended in 25 g of water and 35 g of methanol and 5 g of butanol. At about 55° C, 3 g of acetic acid and 9 g of styrene oxide are simultaneously added dropwise over the course of 30—40 minutes, whilst stirring well. The mixture is stirred for a further 2 hours at 55°-60°. An approximately 40% strength solution of the following dyestuff is obtained:

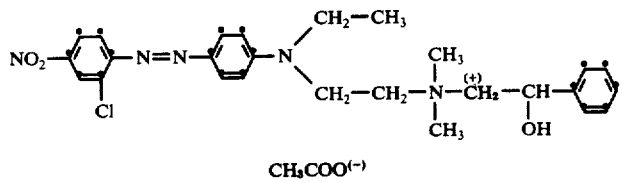

This solution is stable on storage and can be diluted with water in any desired ratio. The K-value of the dyestuff is about K 1.5.

EXAMPLE 12

1,000 cm³ of water are introduced into a dyeing beaker. The pH value is adjusted to 4.5 by adding acetic acid. During heating, 0.25 g of the addition product of 50 mols of ethylene oxide to 1 mol of fatty alcohol are dissolved in this dye bath, and 2 cm³ of the dyestuff solution according to Example 7 are added; this dyestuff solution immediately disperses to give a clear solution. 50 g of polyacrylonitrile yarn are introduced into this dye bath at 60° C and the temperature is raised to 98° C over the course of 20-30 minutes. The dyeing is maintained at 98°-100° C for 1 hour. The yarn is then rinsed and washed. The dyeing has a yellow-brown colour and shows outstanding fastness properties.

A comparable good dyeing is obtained if instead of the polyacrylonitrile yarn acid-modified polyester or polyamide yarn is employed in the same quantities.

EXAMPLE 13

1,000 cm³ of water and 0.3 g of the quaternary compound of the following formula

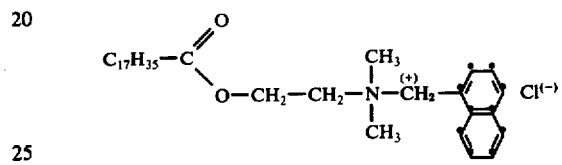

are introduced into a dyeing beaker. The dye bath is heated to 50° C and 50 g of polyacrylonitrile yarn are introduced. After 10 minutes, 1 cm³ of the dyestuff solution obtained according to Example 11 is added whilst stirring and the dye bath is heated to 98°-100° C. After 1 hour, the dyeing is complete. The yarn is rinsed, washed and dried. It is outstandingly evenly dyed in a strong muted red. The light fastness of the dyeing is about 7.

EXAMPLE 14

The following printing mixture is prepared with the dyestuff solution obtained according to Example 11: 80 parts of the dyestuff solution, 500 parts of alginate thickener, 10 parts of acetic acid and 410 parts of water. Polyacrylonitrile fabric is printed with a pattern by the screen printing process, dried and treated in a steamer until the dyestuff has been fixed. The print is then rinsed, washed, again rinsed and dried. The fixing has progressed sufficiently far after the customary fixing time that hardly any further dyestuff can be rinsed off during rinsing and washing.

EXAMPLE 15

A dyeing mixture is prepared from the following substances in a closed dyeing apparatus equipped for solvent dyeing: 1,000 cm³ of perchloroethylene, 5 g of an emulsifier which has been prepared by addition of 30 mols of ethylene oxide to castor oil, 4 g of oleic acid diethanolamide, 8 g of water and 4 g of the yellow-brown perchloroethylene-soluble dyestuff preparation of the following structure:

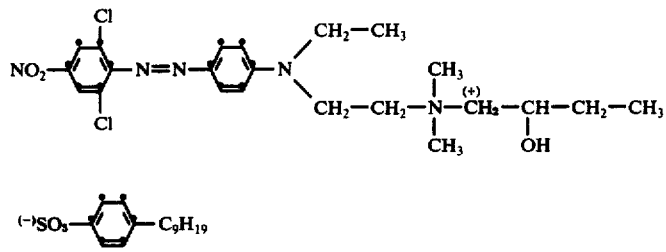

100 g of acrylonitrile knitwear are introduced into the dyestuff emulsion which has been produced by good stirring. The bath is heated for 1 hour to 96°-98° C in a closed apparatus, whilst circulating the dyeing liquor by means of a pump. The fabric is then washed with perchloroethylene and dried. Knitwear dyed yellow-brown, which has retained its original loose form, is obtained.

EXAMPLE 16

1,000 cm³ of water are introduced into a dyeing beaker. After warming to 55°-60° C, 3 g of an emulsifiable preparation of cresotic acid methyl ester are emulsified in the water and 100 g of a polyester yarn which can be dyed with basic dyes are added. The yarn is first treated for 10-15 minutes with the carrier and 1 g of the dyestuff solution according to Example 3 is then added. The system is heated to 98°-100° C and the dyeing is completed in one hour at this temperature. The polyester yarn is dyed in a muted red shade.

I claim:
1. Cationic azo dyestuff of the formula

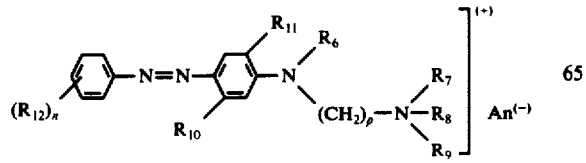

wherein
$R_6$ denotes methyl, ethyl, propyl, or butyl,
$R_7$ denotes methyl, ethyl, propyl or butyl,
$R_8$ denotes methyl, ethyl, propyl or butyl,
$R_9$ denotes 2-hydroxypropyl, 2-hydroxybutyl, 2-hydroxyethylphenyl, 2-hydroxy-3-methoxy-propyl, 2-hydroxy-3-chloro-propyl, 2-hydroxy-3-ethoxy-propyl, 2-hydroxy-3-propoxy-propyl, 2-hydroxy-3-allyloxy-propyl, 2-hydroxy-3-butoxy-propyl, 2-hydroxy-3-phenoxy-propyl or 2-hydroxy-3-benzoxy-propyl,
$R_{10}$ denotes hydrogen, methyl, ethyl, propyl, butyl, chloro, bromo, methoxy, ethoxy, propoxy, acetylamino, propionylamine or methylsulphonylamino,
$R_{11}$ denotes hydrogen, methyl, ethyl, propyl, butyl, chloro, bromo, mthoxy, ethoxy or propoxy,
$R_{12}$ denotes methyl, ethyl, propyl, butyl, chloro, bromo, cyano, nitro, methoxy, ethoxy, propoxy, methoxycarbonyl or ethoxycarbonyl, acetoxy, acetyl, sulphonamido or carbonamido,
$n$ denotes 1 to 5,
$p$ denotes 2 or 3 and
$An^{(-)}$ denotes an anion.

2. Cationic azo dyestuff according to claim 1 of the formula

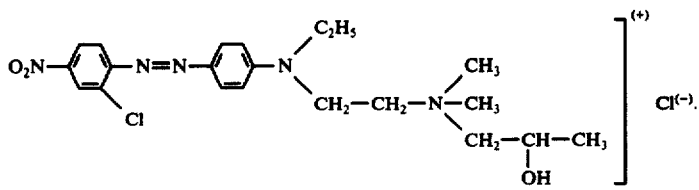

3. Cationic azo dyestuff according to claim 1 of the formula

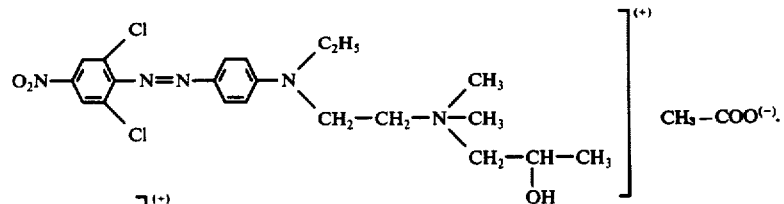

4. Cationic azo dyestuff according to claim 1 of the formula

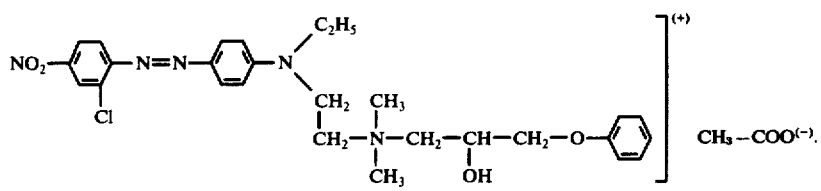
5. Cationic azo dyestuff according to claim 1 of the formula
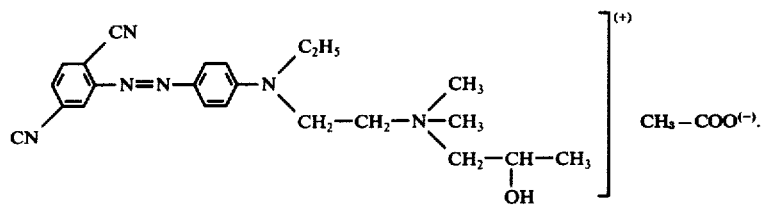
6. Cationic azo dyestuff according to claim 1 of the formula
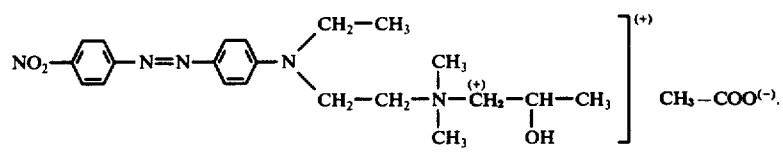
* * * * *